(12) United States Patent
Monty (10) Patent No.: US 7,050,475 B2
(45) Date of Patent: May 23, 2006

(54) WAVEGUIDE LASER

(75) Inventor: Nathan Paul Monty, Charlton, MA (US)

(73) Assignee: LiteLaser LLC, Bloomfield Hills, MI (US)

(*) Notice: Subject to any disclaimer, the term of this patent is extended or adjusted under 35 U.S.C. 154(b) by 0 days.

(21) Appl. No.: 10/692,860

(22) Filed: Oct. 27, 2003

(65) Prior Publication Data

US 2004/0218650 A1  Nov. 4, 2004

Related U.S. Application Data

(60) Provisional application No. 60/467,542, filed on May 2, 2003.

(51) Int. Cl.
H01S 3/22 (2006.01)
H01S 3/03 (2006.01)
H01S 3/97 (2006.01)

(52) U.S. Cl. ............ 372/87; 372/55; 372/64; 372/86

(58) Field of Classification Search ........ 372/55, 372/61, 62, 64, 65, 87
See application file for complete search history.

(56) References Cited

U.S. PATENT DOCUMENTS

| | | | |
|---|---|---|---|
| 3,386,043 A | 5/1968 | Marcatili et al. | 398/142 |
| 3,641,454 A * | 2/1972 | Krawetz | 372/87 |
| 3,757,246 A * | 9/1973 | Basting et al. | 359/333 |
| 3,772,611 A | 11/1973 | Smith | 372/96 |
| 3,852,684 A | 12/1974 | Roess et al. | 372/19 |
| 3,961,283 A | 6/1976 | Abrams et al. | 372/64 |
| 4,005,374 A * | 1/1977 | Levatter et al. | 372/58 |
| 4,064,465 A | 12/1977 | Hundstad | 372/58 |
| 4,169,251 A | 9/1979 | Laakmann | 372/64 |
| 4,287,482 A | 9/1981 | Wert, III | 372/19 |
| 4,367,553 A * | 1/1983 | Neracher | 372/55 |
| 4,438,514 A * | 3/1984 | Chenausky et al. | 372/64 |
| 4,493,087 A | 1/1985 | Laakman | 372/64 |
| 4,507,786 A * | 3/1985 | Dezenberg et al. | 372/33 |
| 4,577,323 A | 3/1986 | Newman et al. | 372/64 |
| 4,787,090 A | 11/1988 | Newman et al. | 372/82 |
| 4,805,182 A | 2/1989 | Laakmann | 372/82 |
| 4,807,232 A | 2/1989 | Hart | 372/18 |
| 4,807,233 A | 2/1989 | Hart | 372/18 |
| 4,807,234 A | 2/1989 | Hart | 372/18 |
| 4,817,108 A * | 3/1989 | Allcock | 372/82 |
| 4,837,769 A | 6/1989 | Chandra et al. | 372/41 |
| 4,870,654 A | 9/1989 | Cantoni | 372/93 |
| 4,884,282 A | 11/1989 | Bridges | 372/97 |
| 4,956,847 A | 9/1990 | Terai | 372/87 |
| 5,048,047 A | 9/1991 | Kozlovsky et al. | 372/92 |
| 5,079,773 A | 1/1992 | Hart et al. | 372/18 |
| 5,140,606 A * | 8/1992 | Yarborough et al. | 372/64 |

(Continued)

OTHER PUBLICATIONS

Cheo, Peter K., "Handbook of Molecular Lasers", ISBN 0-8247-7651-8, Series: Optical Engineering, 1987, pp. 170-181, vol. 14, Marcel Dekker Inc., New York U.S.A.

*Primary Examiner*—Armando Rodriguez
(74) *Attorney, Agent, or Firm*—Nixon & Vanderhye P.C.

(57) ABSTRACT

A laser waveguide, where the laser waveguide can be formed by electrodes and at least one sidewall in a manner allowing a more compact structure than previously provided. Protrusions in the electrodes allow easier laser starts, and sectional sidewall(s) allow easier fabrication of sidewall(s), decreasing manufacturing costs.

21 Claims, 7 Drawing Sheets

U.S. PATENT DOCUMENTS

| | | |
|---|---|---|
| 5,151,917 A | 9/1992 | Perilloux et al. ............ 372/102 |
| 5,321,717 A | 6/1994 | Adachi ........................ 372/100 |
| 5,327,446 A | 7/1994 | Waynant ........................ 372/61 |
| 5,353,297 A | 10/1994 | Koop et al. ..................... 372/64 |
| 5,417,140 A * | 5/1995 | Onozuka et al. .................. 89/8 |
| 5,467,362 A | 11/1995 | Murray ........................... 372/5 |
| 5,508,851 A | 4/1996 | Tachizawa ................... 359/822 |
| 5,600,668 A | 2/1997 | Erichsen et al. ............... 372/87 |
| 5,663,980 A | 9/1997 | Adachi ........................ 372/108 |
| 5,748,663 A | 5/1998 | Chenausky |
| 5,764,505 A * | 6/1998 | Mixon et al. .................... 700/2 |
| 5,953,360 A * | 9/1999 | Vitruk et al. .................. 372/87 |
| 6,185,596 B1 | 2/2001 | Hadad et al. ................ 708/491 |
| 6,192,061 B1 | 2/2001 | Hart et al. ..................... 372/87 |
| 6,195,379 B1 * | 2/2001 | Jones et al. .................... 372/64 |
| 6,414,979 B1 | 7/2002 | Ujazdowski et al. |
| 2002/0131469 A1 | 9/2002 | Vitruk |
| 2003/0058913 A1* | 3/2003 | Shackleton et al. ........... 372/55 |

\* cited by examiner

WAVEGUIDE LASER

CROSS-REFERENCE TO RELATED APPLICATIONS

This application claims the benefit of U.S. provisional patent application No. 60/467,542 filed on 2 May 2003.

FIELD OF THE INVENTION

The invention relates in general to waveguide lasers and particularly but not exclusively to RF excited waveguide lasers.

BACKGROUND OF THE INVENTION

A waveguide laser typically consists of two mirrors, concave or flat, defining an optical resonator cavity coupled together with a waveguide defining an optical path between the mirrors.

The waveguide is typically a channel ground into a ceramic block (e.g. aluminum oxide, $Al_2O_3$) with a lower electrode of aluminum or copper added to complete a cross-section of the waveguide. Alternatively, the waveguide can be ultrasonically drilled down through a piece of ceramic such as aluminum oxide ($Al_2O_3$) to create a continuous closed bore length with upper and lower electrodes parallel to the bore length. Typically, the positive arm of the oscillating electromagnetic field (e.g. Radio Frequency—RF) supply will be coupled into the upper electrode of the waveguide, and the ground plane of the RF supply will be coupled to the lower electrode. Resonance is added between and along the length of the upper electrode to distribute the RF voltage evenly along the length of the electrodes. Finally, the mirrors and waveguide structure are aligned and housed in a vacuum vessel (laser housing) that holds the gas to be excited.

Waveguide lasers suffer from the disadvantage that, for the lengths needed, the waveguides are difficult to fabricate with sufficient accuracy at a reasonable cost to obtain acceptable laser performance. It is very difficult to cost-effectively fabricate a typical waveguide structure that is roughly 30 to 40 cm long with a 1.5 to 3.0 mm bore. Bore cross-section inaccuracy leads to unacceptable laser transverse mode characteristics and reduced power output. Due to the size, current ceramic slabs used to manufacture waveguides are constructed by casting or extruded. Casting or extruding tolerances are high, requiring expensive machining (grinding) after the piece is formed to acquire the desired accuracy.

Additionally, a waveguide laser balances it's loss in inherent internal RF circuit, and heat removal efficiency. Ideally, to minimize the RF losses the capacitance between the top and bottom electrodes (RF+ and RF− or ground) needs to be high, which translates into using as little ceramic as possible between the top and bottom electrodes. With $Al_2O_3$, thermal efficiency requirements dictate the use of a large ceramic area, which creates either a higher loss RF circuit, and/or high manufacturing costs. Ideally materials with good thermal properties such as BeO and AlN are desirable ceramics to use, but are prohibitively expensive with related art waveguide designs.

Additionally, the resonator cavities of waveguide lasers suffer energy losses from misalignment of the containment mirrors and low reflectivity properties of the containment. For example, the use of planar mirrors at either end of the resonator cavity, unless perfectly aligned, enable only a limited number of reflections.

Since the bore cross-sections, in the related art, are the result of grinding or ultrasonic drilling, most bores are either rectangular or circular. This results in bores that are optimized for the manufacturing process rather than the optical properties of the device. For example, the use of curved containment mirrors results in variable beam radius throughout the resonator cavity, thus the waveguide channels of related art fail to allow the optimization of the waveguide with respect to variable beam radius in the resonator channel.

In related art, the electrode positioning, and subsequent resonance electric field generation, is partly a function of the electrode spacing, and is often determined by the size of the waveguide structure (i.e. the distance between electrodes). Various spacing between electrodes results in varying power levels and the related art fails to fully optimize the electrode spacing and optics, and instead conventional methods focus on ease of manufacture.

Additional problems exist in conventional gaseous lasers, for example, laser startup. Traditional $CO_2$ lasers are pressurized at 70–80 torr and have difficultly starting without some manipulation of the RF system.

A related art system is described in Laakmann (U.S. Pat. No. 4,169,251). Laakmann is directed to a conventional waveguide laser that suffers from many of the same problems as other conventional systems (e.g., expensive long ceramic pieces that must be formed via casting, conventional startup characteristics . . . ).

SUMMARY OF THE INVENTION

Exemplary embodiments of the present invention provide methods of gaseous laser construction.

Exemplary embodiments of the present invention provide methods and devices for the use of ceramic portions in the formation of laser waveguides.

Exemplary embodiments of the present invention provide methods and devices for the use of protrusions (e.g., electrode corner radii . . . ) in the formation of laser waveguide structures.

Exemplary embodiments of the present invention provide methods and devices for the combination of protrusions with the use of ceramic portions in the formation of laser waveguides.

Exemplary embodiments of the present invention provide for increased laser power and/or efficiency by optimizing electrode spacing.

An exemplary embodiment of the present invention provides a waveguide laser having a waveguide located in a laser resonator cavity defined by a first and second reflecting means at opposite ends of the waveguide enclosed in a sealed vessel. The waveguide structure is made up of multiple pieces that when joined together form the waveguide walls. The waveguide walls can be made up of individual pieces that allow the walls to be more accurately aligned. The individual pieces can be abutted one to another, or can be separated by a gap with little degradation in the laser power or mode.

Further areas of applicability of embodiments of the present invention will become apparent from the detailed description provided hereinafter. It should be understood that the detailed description and specific examples, while indicating exemplary embodiments of the invention, are intended for purposes of illustration only and are not intended to limited the scope of the invention.

BRIEF DESCRIPTION OF THE DRAWINGS

Embodiments of the present invention will become apparent from the following detailed description, taken in conjunction with the drawings in which.

DETAILED DESCRIPTION OF EXEMPLARY EMBODIMENTS OF THE PRESENT INVENTION

The following description of exemplary embodiment(s) is merely illustrative in nature and is in no way intended to limit the invention, its application, or uses.

Figure 1:
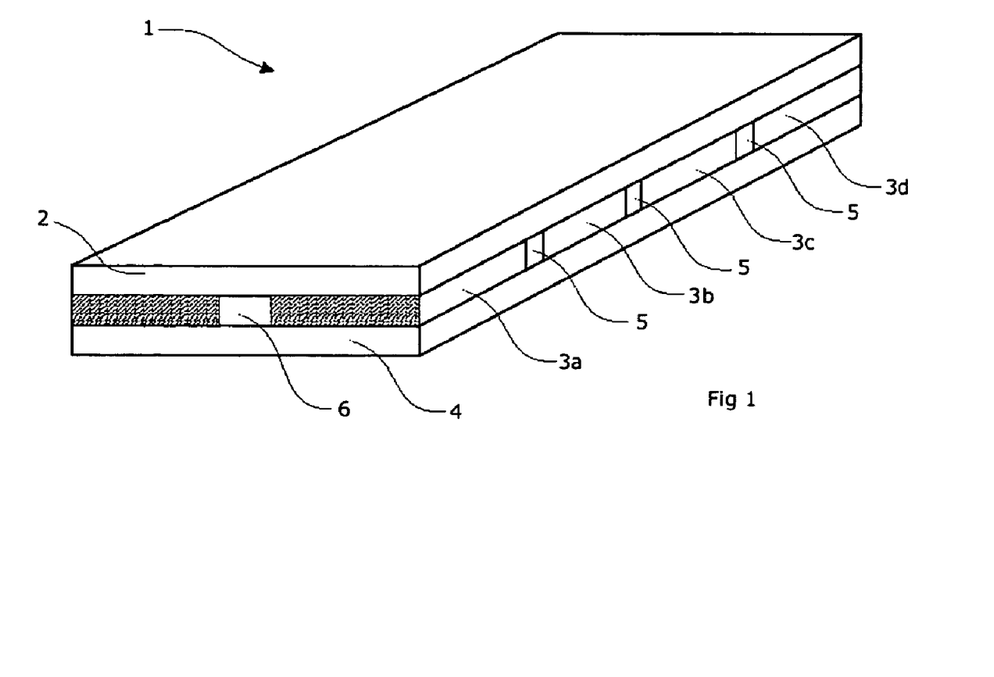
FIG. 1 shows a perspective view of a slab waveguide laser according to an exemplary embodiment of the present invention.

FIG. 1 shows a slab waveguide laser 1 according to an exemplary embodiment of the present invention, comprising a top or upper electrode 2 and a bottom or lower electrode 4. The upper and lower electrodes, 2 and 4 respectively, can have variable shape (e.g., planar, variable thickness, curved . . . ). Sidewalls 3a, 3b, 3c, and 3d are sandwiched between the upper electrode 2 and the lower electrode 4 and can be separated by small gaps 5. The width and thickness of the sidewalls are shown shaded. The length of the sidewalls are not shaded.

The sidewalls 3a, 3b, 3c, and 3d and the upper and lower electrodes 2 and 4 respectively can form a waveguide 6. There can be gaps 5 between the sidewalls 3a, 3b, 3c, and 3d or no gap. In exemplary embodiments of the present invention there can be any number of gaps. In additional exemplary embodiments of the present invention, the sidewalls can seal the waveguide 6 at a predetermined pressure. The waveguide 6 can be sealed at various pressures depending upon the lasing medium or desired operating conditions. For example the waveguide can have electrodes 2 and 4, side walls 3a, 3b, 3c, and 3d with no gaps. In this exemplary embodiment the side walls 3a, 3b, 3c, and 3d extend and surround the electrodes 2 and 4 to form the housing of the laser itself. Likewise the electrodes 2 and 4 can form the housing of the laser (e.g., FIG. 6C).

Figure 2:
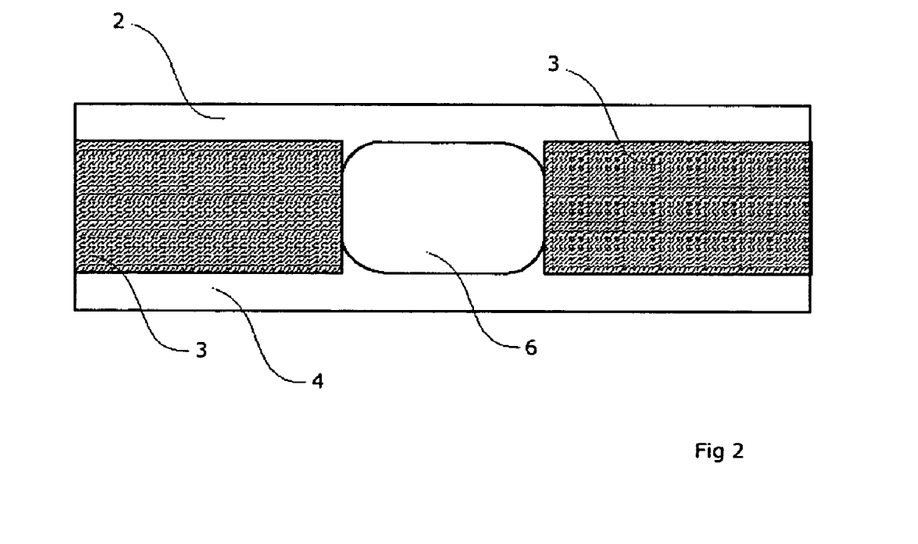
FIG. 2 shows a cross-sectional view of a waveguide laser according to an exemplary embodiment of the present invention.
Figure 6A:
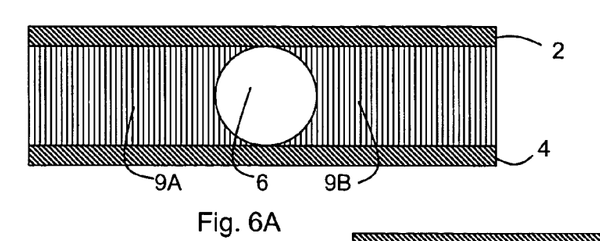
FIGS. 6A–6E show various laser waveguide cross sections in accordance with exemplary embodiments of the present invention.
Figure 6B:
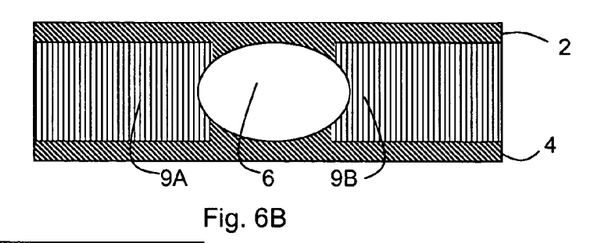

The sidewalls 3a, 3b, 3c and 3d (etc) act to guide the beam to an extent that there is little or no appreciable beam degradation or power loss even if there are gaps between the sections of the sidewalls or sections of the sidewalls and electrodes 2 and 4. Gaps 5 can be of variable size (e.g. 1–3 mm or more, . . . ) without affecting the beam. FIG. 2 shows an end-on view through a transverse section of the waveguide laser 1 of FIG. 1. The upper electrode 2 and the lower electrode 4 are shown shaped so as to form the waveguide 6, with rounded corners (protrusions). The shape of the electrodes 2 and 4 are easily changed such that easier striking and better mode control of the beam is provided. In waveguided lasers and other types of lasers, it is desired for circular symmetry to exist in the beam, which will produce the typical Gaussian shape to the beam intensity. The electrodes may be rounded further than is shown such that there is complete circular symmetry in the waveguide, i.e. the waveguide is completely circular in cross-section (e.g. as shown in waveguide 6 of FIG. 6A). In accordance with exemplary embodiments of the present invention the variable shaping of the cross section of the electrodes can be shaped by conventional methods (e.g., by CNC Milling, . . . ).

Figure 3:
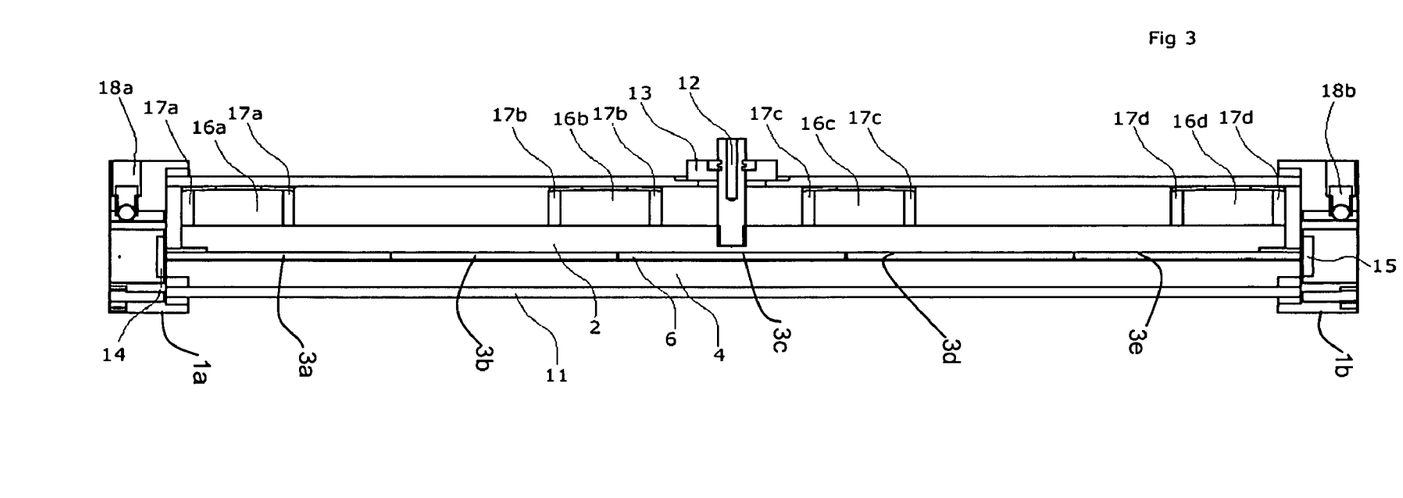
FIG. 3 shows a longitudinal view of section IV—IV of FIG. 4 of a laser, according to an exemplary embodiment of the present invention.
Figure 4:
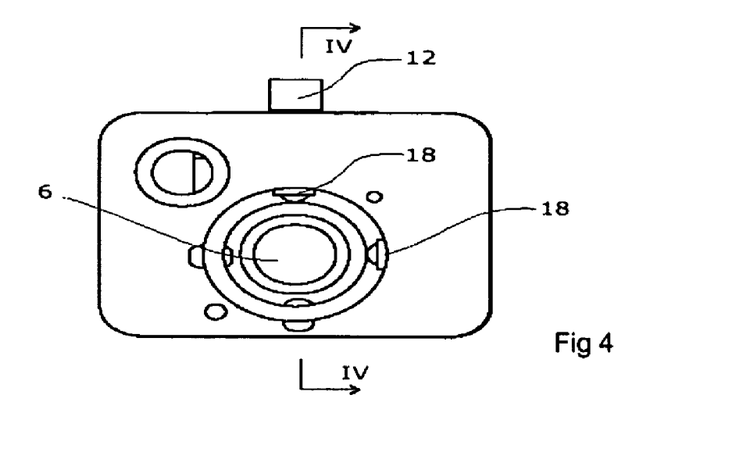
FIG. 4 shows an end view from the output coupler end of the laser, according to an exemplary embodiment of the present invention.

FIG. 3 shows a longitudinal view of section IV—IV of FIG. 4 in accordance with an exemplary embodiment of the present invention. The laser 1 can be disposed within a housing 11 and comprises a cavity contained between the two ends 1a and 1b. End 1a comprises a reflective surface and end 1b comprises a partially reflective surface which forms the output coupler. The RF feed-through 12 can be encircled in an insulating ceramic casing 13. The ceramic casing 13 can be comprised of various materials (e.g., BeO, AlN, $Al_2O_3$, other suitable insulating and/or dielectric material(s)). Although discussion herein has referred to various components, the arrangement of such components and the presence of such components should not be interpreted as being limitative on the scope of the present invention. For example, in accordance with exemplary embodiments of the present invention, a separate housing is not needed in a sealed waveguide structure containing reflective elements, where the sidewalls or electrodes additionally form the housing.

The laser 1 can be contained in a housing 11, with an electrode top or upper plate 2 and bottom or lower electrode plate 4. The top or upper electrode 2 is shown here as continuous but can also comprise one or more sections to assist in alleviating warping due to temperature differentials between the topside and bottomside of the electrodes. The waveguide 6 can be between a total reflector 14 and a partially reflecting surface 15. The total reflector 14 and partially reflecting surface 15 can be placed at the waveguide's 6 ends. The partially reflecting surface 15 can form the output coupler for the beam. The beam can make one or more passes through the waveguide before exiting at the output coupler. Exemplary embodiments of the present invention should not be interpreted to be limited with regard to the number of waveguides placed between the total reflector 14 and the partially reflective surface 15. Exemplary embodiments of the present invention can have multiple waveguides, where the waveguides can be connected or separate.

The exemplary embodiment of FIG. 3 illustrates a case where the ceramic sidewalls, 3a, 3b, 3c, 3d, 3e are abutted to each other, leaving no gaps. In this embodiment of the invention, four ceramic cylinders 16a, 16b, 16c and 16d are used to provide a clamping force between the laser housing and the electrode assembly to hold the laser together. The cylinders 16a, 16b, 16c, 16d can be made of various materials (e.g., BeO, AlN or $Al_2O_3$, other suitable ceramic, . . . ). They are shown here each provided with an inductor 17a, 17b, 17c, 17d, which ensures that the voltage difference along the length of the laser is minimized. In exemplary embodiments, at least one power source can be connected via connector 12.

Screw adjustors 18a and 18b can be used to adjust the optics. Other adjustors can be used to adjust the optics in other planes. Embodiments of the present invention are not limited by the type of optical adjuster and other methods commonly known by one of ordinary skill can be used. The present invention is also not limited to having an optical adjustor.

FIG. 4 shows an end on view of a laser is accordance with an exemplary embodiment of the present invention. Two optic adjustments means 18 can be placed orthogonal to each other to facilitate the adjustment of the optics in two planes, both perpendicular to the optical axis of the beam, the optical axis lying parallel to the bore 6. Other adjustment means, not shown, can be used for adjustment of the optics in the direction parallel to the beam.

Figure 5:
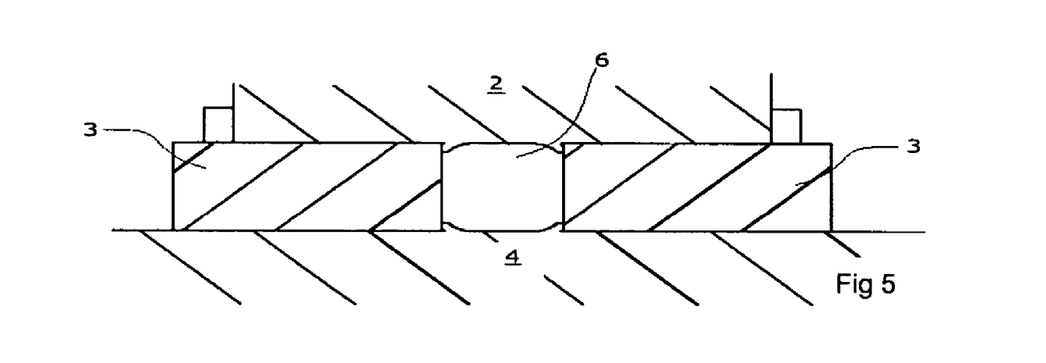
FIG. 5 shows an enlarged view of a waveguide section according to an exemplary embodiment of the present invention.

FIG. 5 shows an enlarged view of the electrodes and waveguide of FIG. 2 in accordance with an exemplary embodiment of the present invention, showing more clearly the electrodes 2 and 4. The electrodes 2 and 4 are profiled to provide a shaped waveguide 6. The electrodes 2 and 4 can be formed with any desired shape to optimize power and beam quality. The profile portion of the electrodes is herein also referred to as a protrusion(s).

Figure 6C:
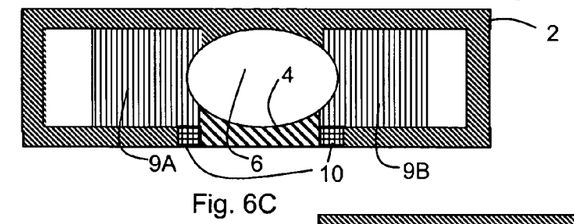
Figure 6D:
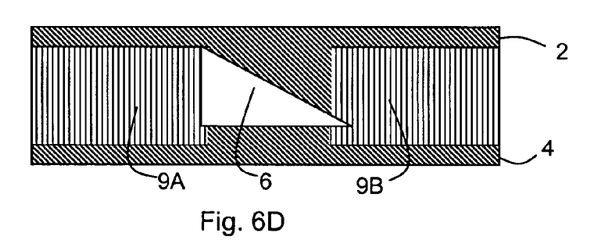

FIGS. 6A–6E show various cross sections of waveguides 6 in accordance with exemplary embodiments of the present invention. In FIGS. 6A through 6D, the waveguides 6 are surrounded by electrodes 2 and 4 and side wall pieces 9A and 9B. The electrodes 2 and 4 and the sidewall(s) can have gaps and not lie flush upon each other. FIG. 6C shows the use of an electrode 2 to form a majority of the housing of a laser waveguide in accordance with an exemplary embodiment of the present invention. Electrode 2 is separated from electrode 4 by an insulative spacer 10, which can be a protruded part of the ceramic side walls 9A and 9B. In further exemplary embodiments of the present invention the sidewall(s) can form the housing.

Figure 6E:
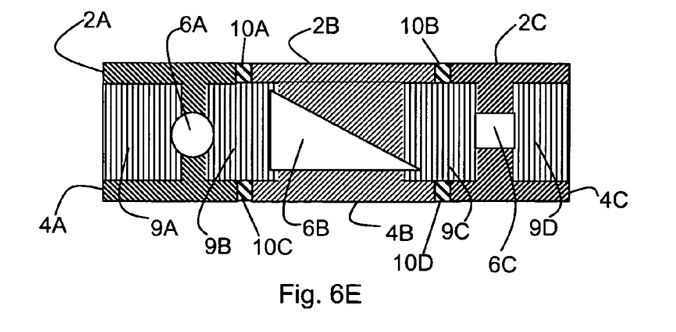

Multiple waveguides (6A, 6B, and 6C) are shown in the exemplary embodiment of the present invention shown in FIG. 6E. As illustrated in FIGS. 6A–6E, exemplary embodiments of the present invention can have multiple shapes of the waveguide 6, multiple shapes and numbers of the electrodes 2 and 4 (e.g. 2A, 2B, 2C, 4A, 4B, and 4C), multiple numbers of waveguides (e.g., 6A, 6B, and 6C), and multiple numbers of side wall pieces (e.g. 9A, 9B, 9C, and 9D). Additionally, the waveguides can be connected at a location along their lengths. Likewise exemplary embodiments of the present invention can have insulators 10, 10A, 10B, 10C, and 10D to insulate the electrodes from each other. In an exemplary embodiment of the present invention one of the multiple waveguides shown in FIG. 6E has no electrodes activated and the chamber acts as a cooling chamber for lasing gas. Where the cooling chamber is one of the waveguides connected to second waveguide somewhere along the length of the waveguide. Where the second waveguide has active electrodes and lasing occurs.

Figure 7:
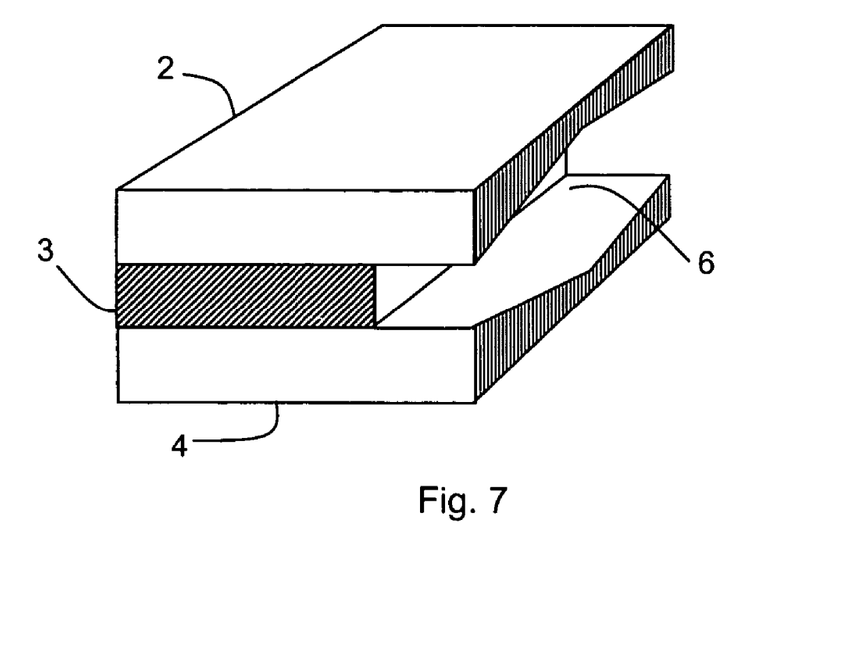
FIG. 7 shows a cross-section of a variable lengthwise waveguide in accordance with exemplary embodiments of the present invention.

FIG. 7 shows a two dimensional lengthwise cross-section of a laser waveguide in accordance with an exemplary embodiment of the present invention. The waveguide 6 has a variable cross-section, in the lengthwise direction, designed specifically for maximizing optical efficiency. The variable cross-section can be of varying shape depending on the optical modes in the waveguide 6. Although FIG. 7 illustrates a symmetric variable shaped cross-section in the lengthwise direction, the shape can be asymmetric or non-symmetrical.

Figure 8:
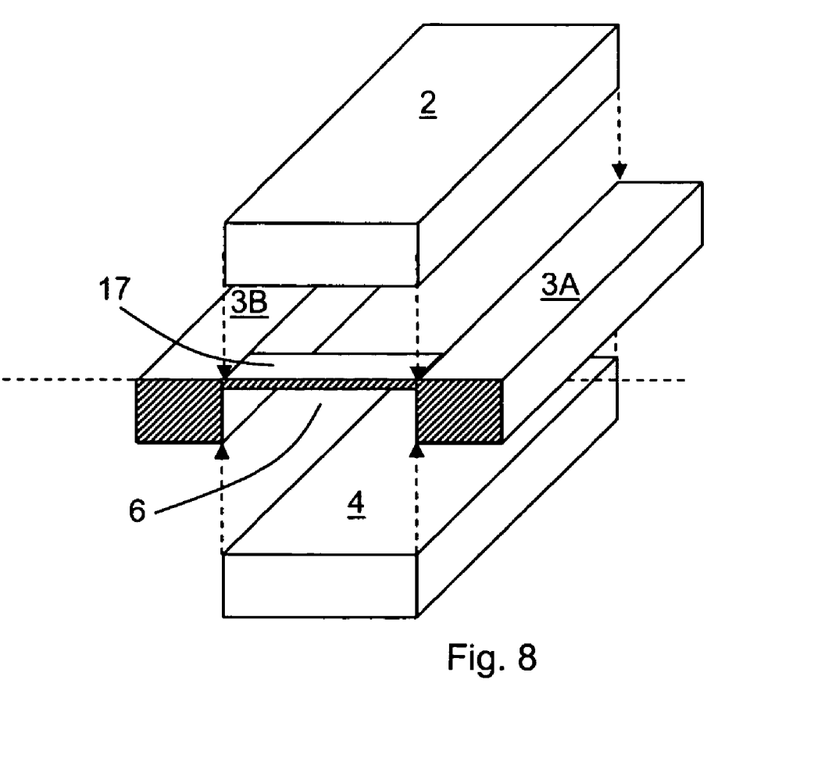
FIG. 8 illustrates an exploded view of a waveguide with single piece ceramic sidewall forming the walls of a waveguide structure in accordance with an exemplary embodiments of the present invention.

Additionally the side walls forming the waveguide 6 can be connected by a strip essentially forming one sidewall with two separate sides. If one sidewall is formed then the strip adjoining the two separate sides can cover the surface of one electrode at a position along the length of the waveguide 6. FIG. 8 illustrates an exploded view of a laser waveguide in accordance with an exemplary embodiment of the present invention having one sidewall with two main sections 3A and 3B. The main sections 3A and 3B can be connected by a strip 17, forming a single sidewall. The strip 17 can also be used to place the electrodes 2 and 4, and there can be many such strips of various shapes and sizes. The waveguide 6 is formed by two surfaces of the main sections 3A and 3B and surfaces of the two electrodes 2 and 4. The discussion herein should not be interpreted to limit the scope of the present invention to sidewalls with a strip connection or to one sidewall. Exemplary embodiments of the present invention can have multiple non-connected sidewalls.

Figure 9A:
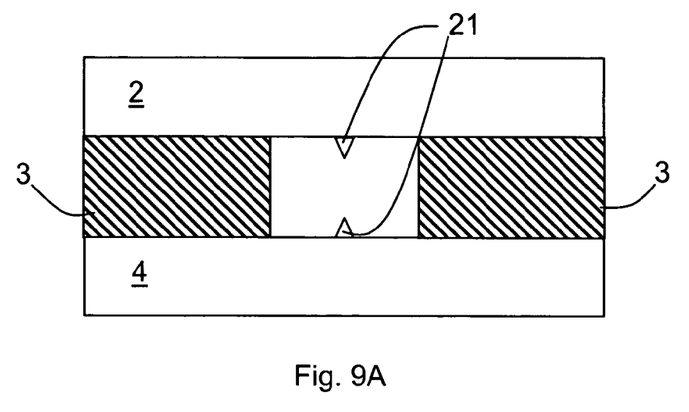
FIGS. 9A–9C show various waveguide electrode protrusions in accordance with exemplary embodiments of the present invention.
Figure 9B:
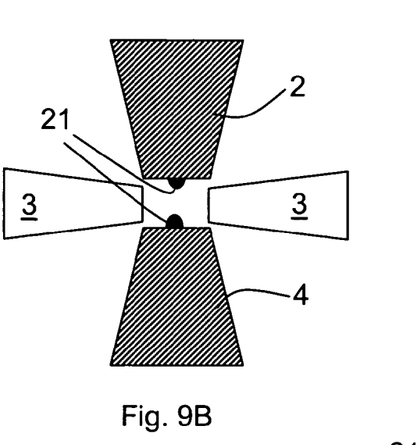
Figure 9C:
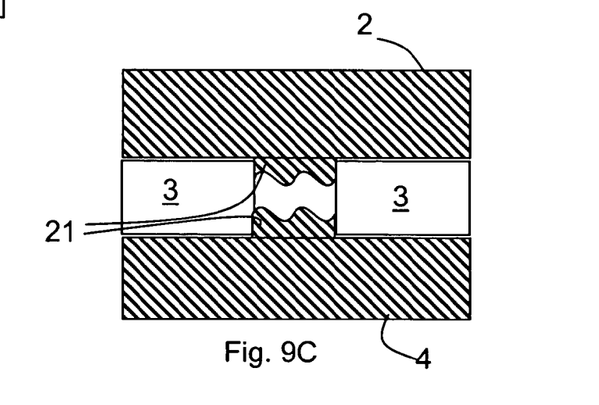

Protrusions aid in the starting characteristics of a laser. FIGS. 9A–9C show some exemplary embodiments of the present invention wherein the electrodes 2 and 4 contain protrusions 21. The protrusions 21 of the electrodes 2 and 4 aid in the starting characteristics of a laser by increasing the electric field in a localized region. For example a $CO_2$ waveguide laser in accordance with an exemplary embodiment of the present invention, having protrusions, can start at 200 Torr pressure as opposed to 70 Torr. The starting pressures given by way of example should not be interpreted to be limitative of the present invention. Lasers in accordance with exemplary embodiments of the present invention can start at various pressures.

In the exemplary embodiments of the present invention described above, the sidewalls (e.g., 3a, 3b, 3c, 3d, 9A, and 9B) can be constructed of various materials depending on the dielectric properties desired. For example the sidewalls can be constructed of ceramic materials (e.g., Beryllium Oxide (BeO), Aluminium Nitride (AlN), . . . ), which are far superior in thermal and other characteristics to Aluminium Oxide ($Al_2O_3$), often used in related art waveguide lasers. BeO and AlN are significantly more thermally efficient and significantly more reflective than $Al_2O_3$. For example, BeO is approximately ten times more thermally efficient. Exemplary embodiments of the present invention allow efficient use of the sidewalls such that the above mentioned materials can be used. Exemplary embodiments of the present invention can also use $Al_2O_3$.

In the exemplary embodiments of the present invention the upper (e.g., RF positive electrode) can be continuous to facilitate the distribution of the RF energy, or sectional. The sidewalls and the lower (e.g., ground electrode) can be continuous and/or manufactured in individual sections and assembled. Individual sections aid in reducing overall cost by providing a low cost standard repetitive platform that can be duplicated and aligned to produce a high quality waveguide structure. The sectional structure will result in reduced cost compared to waveguide structures presently in use. The discussion herein should not be interpreted to limit the present invention to a particular size sectional piece. Various sizes can be used for the length of the sectional pieces besides three inches (e.g., more than 80.0 mm, less than 80.0 mm) in accordance with exemplary embodiments of the present invention. For example in an eighteen inch laser, three sectional pieces can be approximately six inches in length or in a six inch laser each sectional piece can be two inches in length (if there are three sectional pieces. The discussion herein should not be interpreted to limit the dimensions of the sectional pieces. Exemplary embodiments of the present invention additionally contain various sectional pieces, where the pieces are not of equal length and/or width and/or thickness.

Laser waveguides in accordance with exemplary embodiments of the present invention can have shorter side walls than related art waveguides. If the side walls are formed of sectional pieces, such as less than three inches, ceramics with favorable thermal properties (e.g., BeO, AlN, . . . ) can be used effectively and at a lower cost. Ceramics with favorable thermal reflectivity properties can maintain a high thermal conductivity while minimizing RF circuit losses.

The pieces can be formed by pressing, sintering or casting. Pressing allows the use of less milling (light milling) to obtain the tolerances needed, thus there is less milling costs. Milling of ceramic is often referred to as grinding. Sintering and casting are relatively cheap. For example, although BeO is approximately twice the price of $Al_2O_3$ yet it is approximately ten times more thermally conductive than $Al_2O_3$. AlN is approximately five time more thermally conductive. Since conductively is greater, less material is needed, and the resulting cost is reduced. In addition to cost savings, the superior reflectivity available from these materials provides higher efficiency.

In an exemplary embodiment of the present invention a gaseous lasing material is used such as $CO_2$ or mixtures thereof (e.g. $CO_2$, He, $N_2$, . . . ). A $CO_2$ waveguide is unlike a fiber optic waveguide in several relevant respects. The $CO_2$ waveguide is referred to as a "leaky mode" waveguide, so gaps in the waveguide are possible and cause little or no adverse changes to the optical properties. Thus, the multiple pieces of ceramic or other suitable material (e.g., BeO, AlN, . . . ) do not have to be carefully joined and a gap can be left between one piece and the next. The gap can vary in size (e.g., one to three mm or more). Moreover, the top and bottom electrode can be shaped independently of the ceramic and each other, to form a profile that provides a better beam mode profile. For example some or all of the four corners of the waveguide can be rounded to suppress higher order mode formations, and the distance between the top and bottom electrodes can be decreased along the ceramic sidewalls to allow for easier gas discharge initiation while maintaining the same overall gap size and consequently having approximately the same discharge volume (i.e. gain volume).

In exemplary embodiments of the present invention the various shapes of the electrodes allows higher peak power compared to related art devices. FIGS. 9A–C illustrate various electrode protrusion shapes in accordance with exemplary embodiments of the present invention. The protrusions (also referred to as nips) result in stronger electric fields in a limited regional area, thereby aiding in the startup of the laser. Such protrusions allow startups at pressures higher than conventional lasers. The increased laser pressure results in an increase of gain volume and subsequent increase pulse power capabilities, but with a decrease in the average power emitted from the laser. An exemplary embodiment of the present invention increases the temporal pulse length to maintain total pulsing power. Thus, quicker start and stop times can be achieved, with increased efficiency, while maintaining total emitted power, when compared to related art devices.

Figure 10:
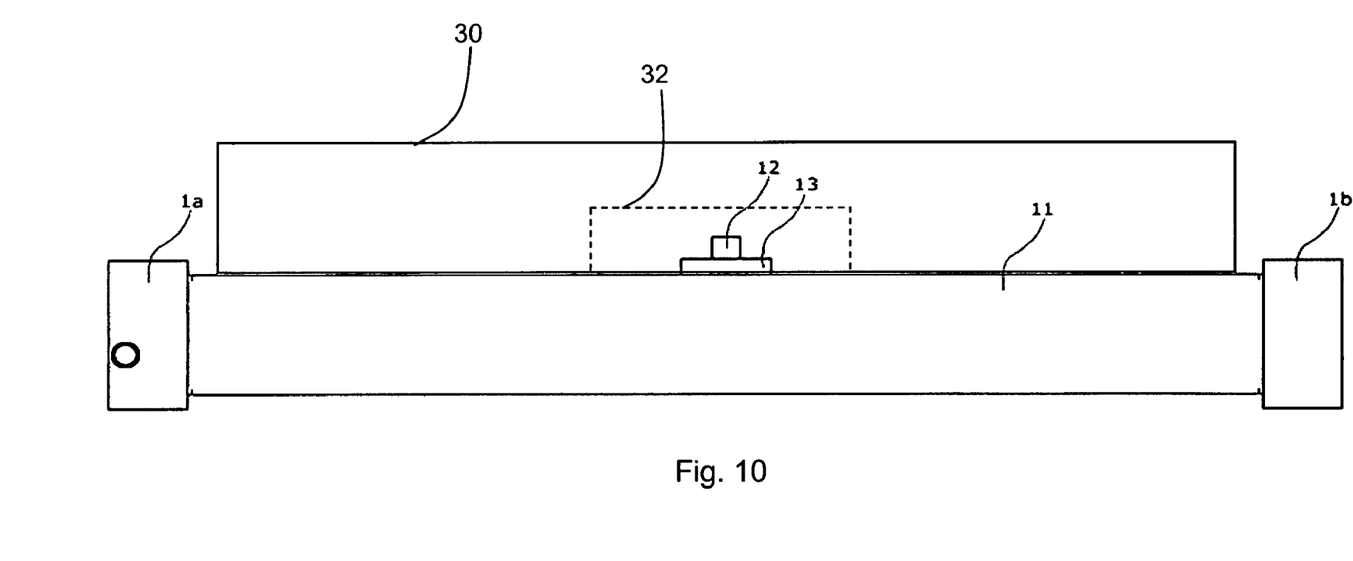
FIG. 10 illustrates a power source connection in accordance with exemplary embodiments of the present invention.

FIG. 10 illustrates the connection of at least one power source in accordance with an exemplary embodiment of the present invention. A power source 30 is connected to a connector 12, which feeds power from the power source through the housing 11. In an exemplary embodiment of the present invention the power source is an radio frequency (RF) power source. A RF power supply for any gas laser is composed of one or more RF power transistors and control circuitry for both the transistor(s) and the interface between the RF power supply and the laser. The RF frequency that the transistors generate is unique to every laser but typically is at 40.68, 81.36 or 100 MHz. The control circuitry for the RF power transistors regulates both the RF oscillation and the RF power on/off switching. Conventional RF power systems use relatively old design practices in the transistor drive circuitry, because the RF power transistor's oscillations at 40 to 100 MHz disrupt any microprocessor's circuitry. Consequently the RF power transistor circuitry is presently designed to incorporate discreet components that are virtually insensitive to the power transistor's oscillations.

In an exemplary embodiment of the present invention, the RF power supply can be microprocessor 32 controlled. In this embodiment the microprocessor 32 runs at a frequency higher than the 40 to 100 MHz level of the RF power transistors. For example a processor at ten times the RF power level would be at 100 MHz×10=1.0 GHz. Any signal 'picked up' by the GHz processor can be significantly below its noise threshold such that the processor's operation is not impaired. Consequently the microprocessor 32 can replace existing discreet component circuitry that controls the RF power transistors. For example, various parts of the discrete TTL logic circuitry can be replaced by the microprocessor 32, for example a one shot discrete IC, that is part of the RF power transistor's VSWR protection circuit, can be eliminated. Additionally, various orgates, opamps and comparators can be eliminated. Other portions of the power system can be replaced by the microprocessor 32 and the discussion herein should not be interpreted to limit the portions replaced.

The use of a microprocessor 32 allows the RF power supply board to be manufactured at a lower cost and for the supply to be significantly smaller. The elimination of numerous discreet components greatly increases the microprocessor based supply's reliability compared to existing designs. The discussion herein is not intended to limit the number or type of microprocessor that can be used with/in the RF power supply.

The description of the invention is merely exemplary in nature and, thus, variations that do not depart from the gist of the invention are intended to be within the scope of the embodiments of the present invention. Such variations are not to be regarded as a departure from the spirit and scope of the present invention (e.g., other gases besides CO2 or CO2 mixtures can be used; protrusions can be used with an all metal system, where the ceramic side walls are replaced with metallic side walls; additional waveguides can be used as coolant chambers, . . . ).

What is claimed is:

1. A laser comprising:
   first and second electrodes provided at different elevations and which are approximately parallel to one another,
   first and second sectional sidewalls provided at least partially between the first and second electrodes, an elongated cavity defined between opposing major surfaces of the first and second electrodes and between the first and second sidewalls, and wherein an optical axis of the laser is defined at least partially in the elongated cavity along a lengthwise direction of the cavity so that the optical axis is provided between opposing approximately parallel surfaces of the first and second electrodes, at least one protrusion on the first and/or second electrode, the protrusion extending into the cavity from the first and/or second electrode so that the protrusion extends from a main body of the first and/or second electrode into the cavity in a direction transverse to the optical axis of the laser; and wherein each of the first and second sectional sidewalls comprise adjacent sections that are spaced apart from one another.

2. The laser of claim 1, wherein protrusions are formed on each of the first and second electrodes.

3. The laser of claim 1, where the at least one protrusion aids in starting characteristics of the laser by increasing the electric field in localized region(s) of the cavity.

4. The laser of claim 1, wherein the laser is a $CO_2$ waveguide laser that uses a gaseous lasing material comprising $CO_2$.

5. The laser of claim 1, wherein the sidewalls comprise ceramic.

6. The laser of claim 5, wherein the sidewalls comprise one of BeO, $Al_2O_3$ and/or AlN.

7. The laser of claim 1, wherein respective sections of the sidewalls are less than 200 mm in length.

8. The laser of claim 1, wherein an electromagnetic field is caused by an oscillating current supplied to at least one of the electrodes such that the electromagnetic field is provided in the cavity.

9. The laser of claim 1, wherein the cavity has length, height and width dimensions, and wherein the protrusion extends from the main body of the first and/or second electrode in a direction perpendicular to a direction corresponding to the length of the cavity.

10. The laser of claim 1, wherein the first electrode is at a top side but not a bottom side of the elongated cavity, and the second electrode is at a bottom side but not a top side of the elongated cavity.

11. The laser of claim 1, wherein the first and/or second electrodes extend along substantially the entire length of the cavity.

12. The laser of claim 1, wherein the protrusion extends from the main body of the first and/or second electrode in a direction orthogonal to a direction in which gas extends through the cavity.

13. The laser of claim 1, wherein the protrusion extends from the main body of the first and/or second electrode in a direction orthogonal to a length of the cavity.

14. The laser of claim 1, wherein the protrusion extends further into the cavity than does any other part of the electrode on which the protrusion is provided.

15. The laser of claim 1, wherein the protrusion protrudes from a flat major surface of the first and/or second electrode, and wherein other portions of the flat major surface not supporting the protrusion help define the cavity.

16. A laser comprising:

first and second electrodes, first and second sectional sidewalls provided at least partially between the first and second electrodes, an elongated cavity defined between at least opposing major surfaces of the first and second electrodes and between the first and second sidewalls, and wherein the first and second electrodes are continuous and are each provided along the entire length of the cavity, at least one protrusion on the first and/or second electrode, the protrusion extending into the cavity from the first and/or second electrode so that the protrusion extends from a main body of the first and/or second electrode into the cavity in a direction transverse to an optical axis of the laser, and wherein the first electrode is provided at a top side but not a bottom side of the elongated cavity, and the second electrode is at a bottom side but not a top side of the elongated cavity; and wherein each of the first and second sectional sidewalls comprise respective adjacent sections of sidewall that have respective gaps therebetween.

17. The laser of claim 16, wherein the optical axis of the laser is defined at least partially in the elongated cavity along a lengthwise direction of the cavity.

18. The laser of claim 16, wherein the optical axis is provided between opposing approximately parallel surfaces of the first and second electrodes.

19. The laser of claim 16, wherein the protrusion extends further into the cavity than does any other part of the electrode on which the protrusion is provided.

20. The laser of claim 16, wherein the protrusion protrudes from a flat major surface of the first and/or second electrode, and wherein other portions of the flat major surface not supporting the protrusion help define the cavity.

21. The laser of claim 16, wherein the laser is a waveguide laser.

* * * * *